United States Patent
Dandekar et al.

(10) Patent No.: US 8,854,962 B2
(45) Date of Patent: Oct. 7, 2014

(54) METHODS FOR COUPLING INFORMATION HANDLING SYSTEMS THROUGH A COMMUNICATIONS STACK

(75) Inventors: Shree Dandekar, Round Rock, TX (US); Pratik Mehta, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 438 days.

(21) Appl. No.: 13/010,293

(22) Filed: Jan. 20, 2011

(65) Prior Publication Data

US 2012/0188905 A1    Jul. 26, 2012

(51) Int. Cl.
*G01R 31/08* (2006.01)
*H04L 29/08* (2006.01)

(52) U.S. Cl.
CPC ............ *H04L 67/141* (2013.01); *H04L 69/324* (2013.01); *H04L 69/323* (2013.01); *H04L 69/325* (2013.01)
USPC .......................................... 370/231; 370/390

(58) Field of Classification Search
CPC ..................... H04L 63/0428; H04L 2463/101; H04L 63/10; H04L 67/16
USPC ............................ 370/230, 231, 254, 328, 401
See application file for complete search history.

(56) References Cited

U.S. PATENT DOCUMENTS

| | | | |
|---|---|---|---|
| 8,228,808 B2 * | 7/2012 | Goto et al. ..................... | 370/252 |
| 2003/0174730 A1 * | 9/2003 | Hsueh et al. .................. | 370/469 |
| 2004/0236850 A1 | 11/2004 | Krumm et al. | |
| 2006/0140170 A1 | 6/2006 | Dorner | |
| 2006/0156353 A1 | 7/2006 | Dorner | |
| 2006/0178124 A1 | 8/2006 | Sugar | |
| 2006/0205354 A1 | 9/2006 | Pirzada et al. | |
| 2006/0259982 A1 * | 11/2006 | Upendran ....................... | 726/27 |
| 2007/0030824 A1 | 2/2007 | Ribaudo et al. | |
| 2008/0175244 A1 * | 7/2008 | Iyer et al. ....................... | 370/392 |
| 2008/0248751 A1 | 10/2008 | Pirzada et al. | |
| 2009/0307307 A1 * | 12/2009 | Igarashi ........................ | 709/203 |
| 2010/0246502 A1 * | 9/2010 | Gong et al. .................... | 370/329 |
| 2011/0047055 A1 * | 2/2011 | Funk ............................... | 705/34 |
| 2012/0020428 A1 * | 1/2012 | Roth et al. ...................... | 375/295 |

* cited by examiner

*Primary Examiner* — Jung Park
(74) *Attorney, Agent, or Firm* — Baker Botts L.L.P.

(57) ABSTRACT

A method of coupling multiple information handling systems (IHSs) through a communications stack includes establishing connection between a first IHS and a second IHS at a layer 1 of the communications stack. The method further includes receiving a message indicating a layer 3 protocol of the second IHS and determining whether to establish the connection between the first IHS and the second IHS at a layer 2 of the communications stack, based on the layer 3 protocol.

20 Claims, 3 Drawing Sheets

METHODS FOR COUPLING INFORMATION HANDLING SYSTEMS THROUGH A COMMUNICATIONS STACK

TECHNICAL FIELD

The present disclosure relates generally to the field of information handling systems, and, more specifically, to methods for connecting information handling systems.

BACKGROUND

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Networking systems may facilitate connections that enable the information handling system (IHS) to communicate with external devices. External devices may include peripheral devices, such as printers, cameras, or other IHSs. Typically, networking systems create connections using a protocol known as a communications stack. The communications stack may include multiple layers, each of which may address a portion of the protocol that the network systems use to create and operate the network connection.

The IHS typically starts a connection from the lower end of the stack, working up to the higher levels to operate the connection. Once the lower levels of the stack are operational, the IHS may signal to the user that the connection is available. However, if the higher levels of the stack are not operational, the user may receive an error message in response to attempts to use the connection. As such, if lower levels of the networking stack become operational, and the higher layers do not, the user may receive an error message while believing the connection is readily available, which may lead to a poor user experience and wasted time.

In the example of a wireless printing scenario, a personal digital assistant (PDA), may be established to print a document wirelessly over a network. In order to print, both hardware devices, the PDA and printer, need to discover and connect to one another and require an interface for communication. Thus, at layer 1, the physical interaction between the PDA and printer hardware is established, which will enable layer 2, a data link layer, to establish access among the hardware devices. Should there be a connectivity issue at layer 3, such as a compatibility service to indicate that the printer cannot connect since the desired format is not support, poor customer experience and wasted time may result.

Thus, a need exists for r methods and systems for creating network connections that conserve user resources and improve the user experience. In particular, to expedite the process of device connectivity, an intelligent exchange may need to occur at a lower layer, such as when a device-to-device connection is being established.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides for a method of coupling multiple information handling systems (IHSs) through a communications stack. The method includes establishing connection between a first IHS and a second IHS at a layer 1 of the communications stack. The method further includes receiving a message indicating a layer 3 protocol of the second IHS and determining whether to establish the connection between the first IHS and the second IHS at a layer 2 of the communications stack, based on the layer 3 protocol.

Another aspect of the disclosure provides for a first information handling system (HIS). The first IHS may include a memory operable to store an operating system (OS), wherein the OS is operable to connect the first IHS to a second IHS at a layer 1 of a communications stack. The OS is further operable to receive a message over the layer 1 indicating a service capability of the second IHS, and a layer 3 protocol of the second HIS, and determine whether to connect the first IHS to the second IHS at a layer 2 of the communications stack, based on the service capability and the layer 3 protocol.

Another aspect of the disclosure provides for a method for connecting a first information handling system (IHS) to a second HIS. The method may include connecting the first IHS to the second IHS at a layer 1 of a communications stack and receiving a message over the layer 1 indicating a layer 3 protocol of the second IHS. The method may further include connecting the first IHS to the second IHS at a layer 2 of the communications stack, if the first IHS is compatible with a service capability and if the first IHS supports the layer 3 protocol. If the first IHS is not compatible with the service capability, the method includes prompting a user to retrieve a file to make the first IHS compatible with the service capability.

Another aspect of the disclosure provides for a computer-readable storage medium containing program instructions executable by a processor to execute a method of coupling multiple information handling systems (IHSs) through a communications stack. The method may include connecting the first IHS to the second IHS at a layer 1 of a communications stack. The method may further include receiving a message indicating a layer 3 protocol of the second IHS. The method may further include determining whether to connect the first IHS to the second IHS at a layer 2 of the communications stack, based on the layer 3 protocol.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Before the present systems and methods are described, it is to be understood that this disclosure is not limited to the particular systems and methods described, as such may vary. Also, the present disclosure is not limited in its application to the details of construction, arrangement or order of components and/or steps set forth in the following description or illustrated in the figures. Thus, the disclosure is capable of other aspects, embodiments or implementations or being carried out/practiced in various other ways.

One of ordinary skill in the art should understand that the terminology used herein is for the purpose of describing possible aspects, embodiments and/or implementations only, and is not intended to limit the scope of the present disclosure which will be limited only by the appended claims. Further, use of terms such as "including", "comprising", "having", "containing", "involving", "consisting", and variations thereof are meant to encompass the listed thereafter and equivalents thereof as well as additional items.

It must also be noted that as used herein and in the appended claims, the singular forms "a," "and," and "the" may include plural referents unless the context clearly dictates otherwise. Thus, for example, reference to "a device" refers to one or several components and reference to "a method of coupling" includes reference to equivalent steps and methods known to those skilled in the art, and so forth.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external components as well as various input and output (I/O) components, such as a keyboard, a mouse, and a video display. The IHS may also include one or more buses operable to transmit data communications between the various hardware components.

Figure 1A:
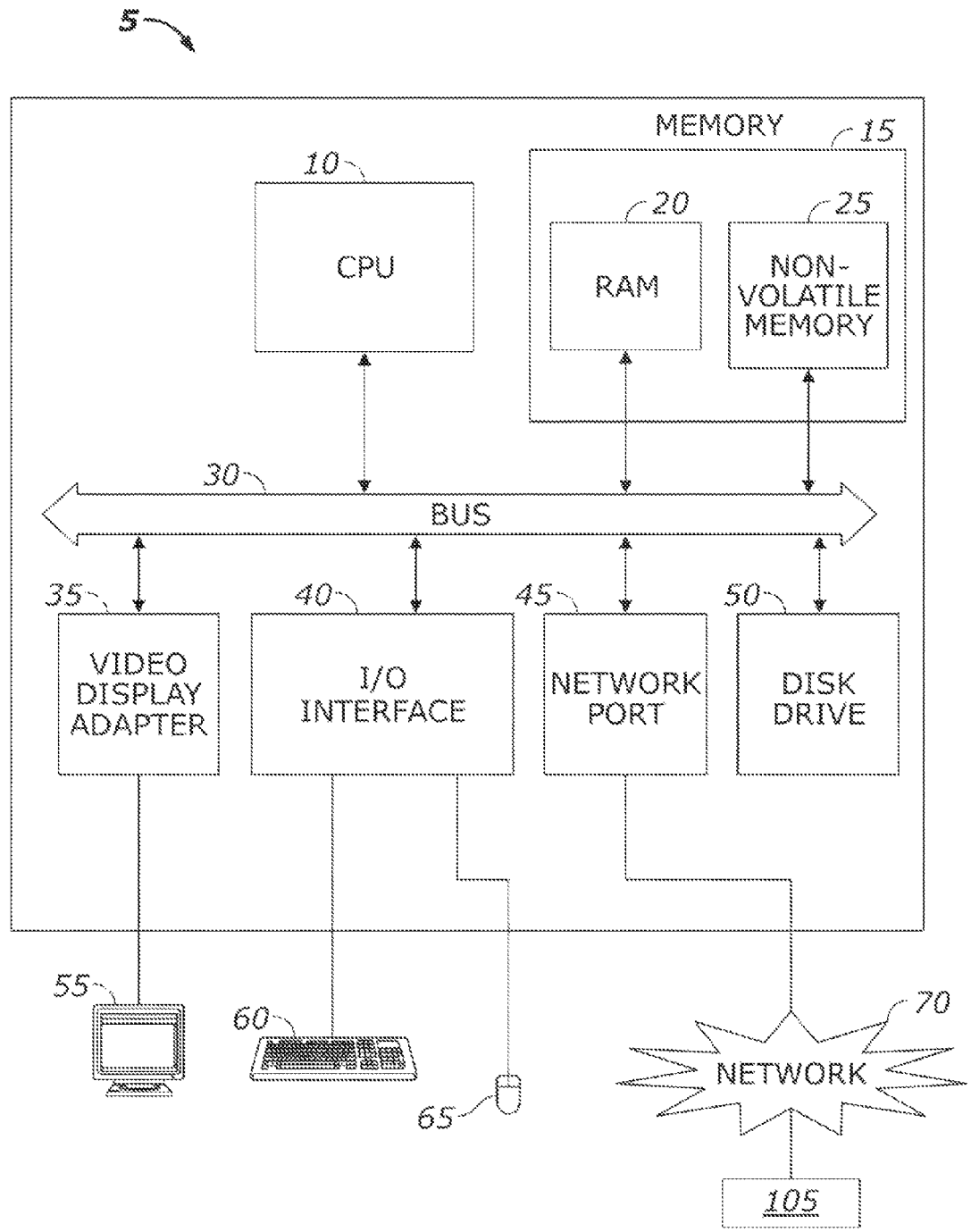
FIG. 1A represents an information handling system (IHS) in accordance with one aspect of the present disclosure.

FIG. 1A illustrates one possible implementation of an IHS 5 comprising a CPU 10. It should be understood that the present disclosure has applicability to IHSs as broadly described above, and is not intended to be limited to the IHS 5 as specifically described. The CPU 10 may comprise a processor, a microprocessor, minicomputer, or any other suitable device, including combinations and/or a plurality thereof, for executing programmed instructions. The CPU 10 may be in data communication over a local interface bus 30 with components including memory 15 and input/output interfaces 40. The memory 15, as illustrated, may include non-volatile memory 25. The non-volatile memory 25 may include, but is not limited to, firmware flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output components not shown here. This type of firmware may be known as a basic/input output system (BIOS). The memory may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

The IHS 5 may also be implemented with a Baseboard Management Controller (BMC) 80. The BMC 80 may contain hardware e and software which enables the BMC to operate independently of the hardware (e.g., CPU 10) and software (e.g., operating system, BIOS, etc.) which controls the IHS 5. The BMC 80 may be electrically coupled to the local interface bus 30 in order to communicate with other components within the IHS 5. The BMC 80 may also be electrically coupled to a plurality of sensors, power connections, or the like, within the IHS 5 such that the BMC 80 may collect information related to the operating conditions of the IHS 5. Additionally, the BMC 80 may be electrically coupled to a reset control of the IHS 5 such that the BMC 80 may reset or restart the IHS 5.

Additionally, the BMC 80 may be electrically coupled to the network port 45 within the IHS 5 to permit communication over the network 70 with a second IHS 105. Furthermore, the BMC 80 may be electrically coupled to other ports (e.g., serial port) and/or components within the IHS 5 such that the BMC 80 may communicate by other means with the second IHS 105 or with a plurality of IHSs. For example, the IHS 5 may be a remotely configured IHS which is coupled via the network 70 to other remotely configured IHSs or to a remote management IHS.

Additionally, a second IHS 105 may provide a service to the first IHS 5. For example, in one possible implementation, the IHS 5 may be a digital camera, and the second IHS 105 may be a printer. In such an implementation, the second IHS 105 may provide a print service to the first IHS 5 if the images stored on the first IHS 5 are in a format supported by the printer 105.

It should be noted that the camera and printer configuration is merely one possible implementation of the first IHS 5 and the second IHS 105. The first IHS 5 and the second IHS 105 may include any two IHSs where the second IHS 105 may provide a service to the first IHS 5. Other possible IHSs may include personal computers, mobile computing devices, telephones, and the like.

Figure 1B:
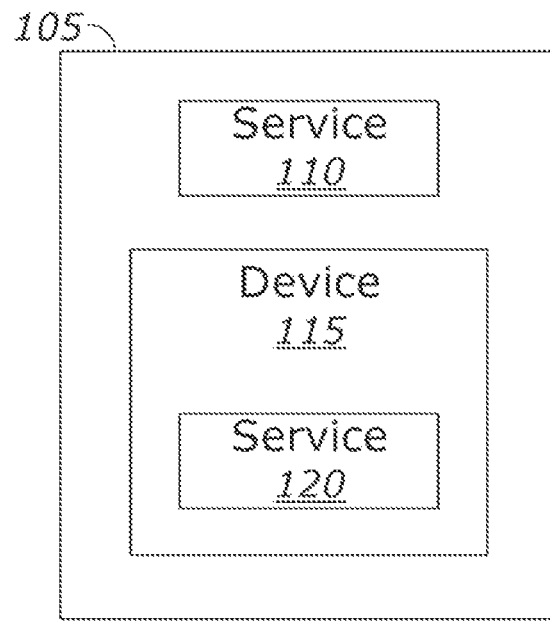
FIG. 1B represents an IHS in accordance with one aspect of the present disclosure.

FIG. 1B illustrates one possible implementation of the second IHS 105. As stated previously, the second IHS 105 may provide a service 110 to the first IHS 5. Additionally, in one implementation of the various techniques described herein, the second IHS 105 may include an embedded device 115.

As shown, the embedded device 115 may be embedded as part of the second IHS. The embedded device 115 may be controlled by a CPU, as described above with reference to FIG. 1A.

The embedded device 115 may further be an IHS configured to perform a specialized service 120. Examples of the second IHS 105 may include special purpose point of sale devices, such as kiosks for downloading movies, printing pictures, sending and receiving faxes, or the like.

Figure 2:
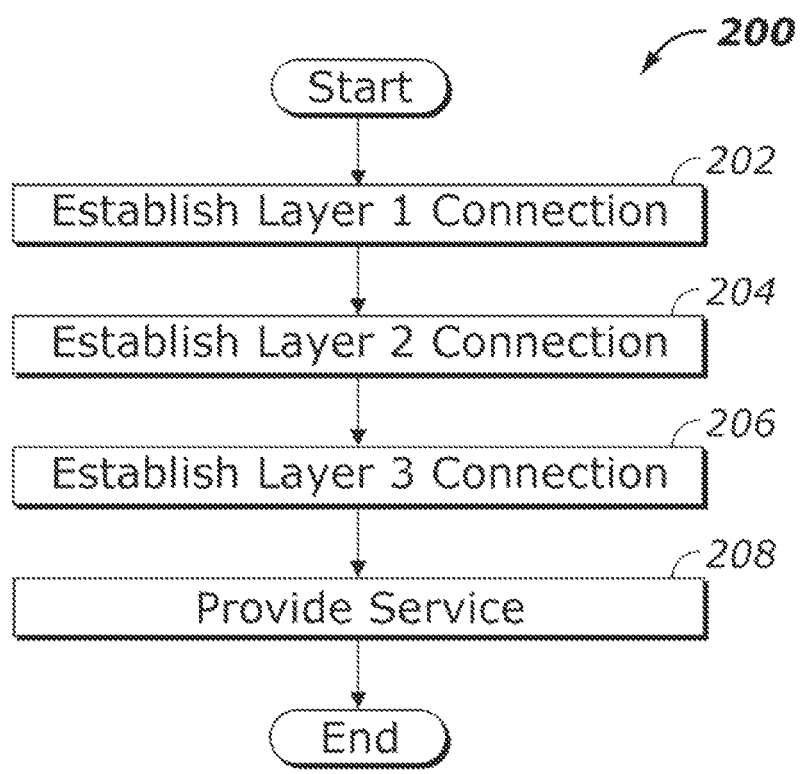
FIG. 2 provides a flow diagram of a method for connecting IHSs in accordance with one aspect of the present disclosure.

FIG. 2 provides a flow diagram of a method 200 for coupling a first IHS 5 with a second IHS 105 in accordance with another aspect of the present disclosure. In particular, the method 200 may be directed towards the BMC 80. At step 202, the IHS 5 may connect to the IHS 105 at a layer 1 of a communications stack. A communications stack may be a software implementation of a computer networking protocol suite. The suite may include the definition of the networking protocols, and the stack may be the software implementation of such protocols. Individual protocols within a suite are often configured to implement design and evaluation pertaining to IHSs. The networking protocol suite contains individual protocols referred to as layers in the stack of protocols, wherein each individual protocol usually communicates with other individual protocols contained in the stack. Since each networking protocol module usually communicates with two other protocols, they are commonly imagined as layers in a stack of protocols.

The TCP/IP networking protocol model, as one of the most common networking protocol suites, may include at least three basic layers of operations. Layer 1 is known as a physical layer pertaining to interaction between hardware components. Layer 2 is known as a data link layer defining an access method between stations of the network and may include Wi-Fi, WPS, Wi-MAX and a variety of data links, for example. Layer 3 is known as a network layer including internet protocol (IP) network protocol which manages the movement of data packets, e.g., incoming client requests, within the network.

Typically, two or multiple connecting IHSs share the same IP address on layer 2 instead of layer 3 or higher layers. On layer 2, the network nodes, referring to active connecting points capable of sending, receiving, or forwarding information through a communication channel, would complete the sharing of an internet protocol (IP) address by multicasting the IP address information to each other and preparing for a connection. More complex aspects such as addressing, service discovery, device control, and presentation are generally handled by layer 3 protocols. Due to the increased complexity, layer 3 normally consumes more processing resources than lower level layers, such as layer 2 and layer 1.

The lowest protocol, layer 1, may pertain to the lowest level, i.e., the physical interaction of the hardware. Layer 1 is known as a physical layer and may include an Ethernet physical layer, modems, optical fiber, coaxial cable, and a variety of physical layer items within a network.

With each additional layer, additional features are introduced to the network protocol. Layer 2 is generally known as a data link layer and may include DCE, Wi-Fi, Wi-MAX, and other varieties of data links. Next, layer 3 is generally known as a network/Internet layer and may include Internet protocol (IP) and a variety of networks. In one implementation of the various techniques described herein, a message may be a root device discovery message allowing automatic detection of root devices and services offered by devices on a network such as that used in UPnP. In such an implementation, the service discovery message, which may specify layer 3 protocols, and supported the formats, may be incorporated into the root device discovery message.

Subsequent higher layers of operation, such as layer 4 and layer 5, may be known as a transport layer including TCP, UDP, and other transport layer items, and an application layer including iSCSI, HTTP, and other applications, respectively.

At step 204, the first IHS 5 may receive a message indicating a layer 2 protocol of the second IHS 105. In one implementation of the various techniques described herein, the second IHS 105 may advertise service capabilities that the IHS 105 provides in a message sent to, and received by the first IHS 5. In one implementation of the various techniques described herein, in a network 70 with multiple IHSs, the message may be multicast.

A service capability may specify all services the second IHS 105 may potentially provide to the first IHS 5. Additionally, the message may specify one or more layer 3 protocols supported by the IHS 105 by incorporating the layer 3 protocol identifiers into the message. Examples of layer 3 protocols include Universal Plug and Play (UPnP), Bonjour, and Digital Living Network Alliance (DLNA).

As part of step 204, the second IHS 105 may include additional information in the message to facilitate the creation of a usable network connection between a first IHS 5 and a second IHS 105. For example, where the IHS 5 is a digital camera and the IHS 105 is a printer, the format of the image files stored on the camera may not be supported by the printer. As such, the IHS 105 may include in the message file formats supported by the printer in step 204.

Before establishing a connection at layer 2 of the communications stack, the BMC 80 may determine whether a first IHS 5 and a second IHS 105 share a layer 3 protocol. Accordingly, at step 206, a layer 3 connection is established. To this end, the BMC 80 may determine whether to connect the first IHS 5 to the second IHS 105 at layer 2 of the communications stack based on the layer 3 protocol specified in the message, and to provide service in step 208.

If the first IHS 5 and the second IHS 105 share a layer 3 protocol, the first IHS 5 may create a connection at layer 2 of the communications stack. If the first IHS 5 and the second IHS 105 do not share a layer 3 protocol, a usable network connection between the first IHS 5 and the second IHS 105 may not be established.

Additionally, where the message received by a first IHS 5 indicates formats supported by the second IHS 105, the determination as to whether to establish a connection at layer 2 may be further based on the formats specified in the message. Using the example of the camera as the first IHS 5, the camera may only contain image files stored in the Joint Photographic Experts Group (JPEG) format. Accordingly, if the message does not specify that the JPEG format is supported by the printer (i.e., IHS 105), the BMC 80 may determine not to establish a connection at layer 2.

Figure 3:
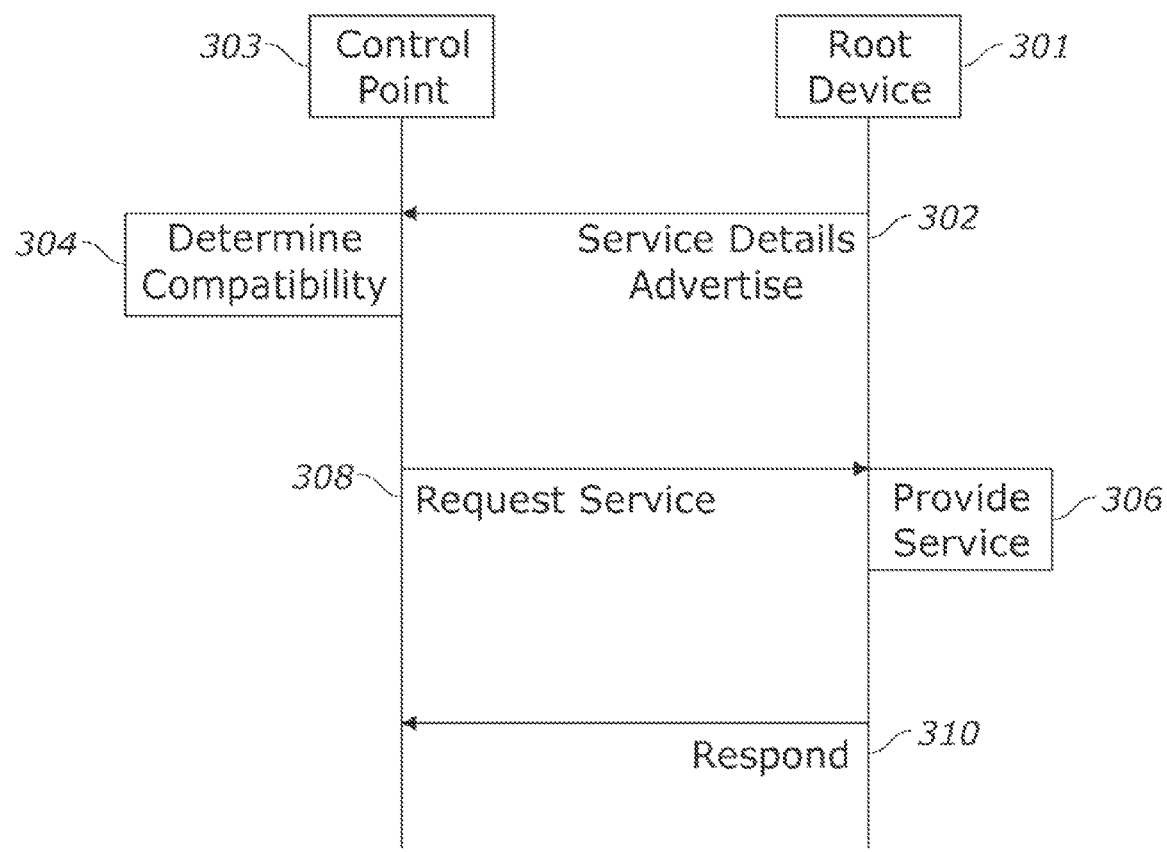
FIG. 3 represents a message flow diagram for establishing a layer 2 connection on a communications stack in accordance with one aspect of the present disclosure.

FIG. 3 represents a message flow diagram for establishing a layer 2 connection with a root device 301 on a communications stack in accordance with one aspect of the present disclosure. The second IHS 105 may advertise service capabilities in a message to the first IHS 5 in step 302. In one implementation of the various techniques described herein, the first IHS 105 may contain a file that it may use to resolve compatibility between the first IHS 5 and the second IHS 105.

As stated previously, the message may specify layer 3 protocols and supported formats on the second IHS 105. As such, at a control point 303, such as upon receiving the message, the first IHS 5 may determine the compatibility of a network connection with the second IHS 105 in step 304. The determination may be based on the layer 3 protocols and formats specified in the message.

As part of step 304, the present disclosure provides a method to speed the process of device connectivity by providing an additional information exchange interface at layer 2. By way of example, a typical Universal Plug and Play (UPnP) architecture may illustrate an implementation of step 304. In the event that a device is added to the network, a UPnP discovery protocol allows the newly added device to advertise its services to control points 303 on the network. Similarly, when a control point 303 is added to the network, the UPnP discovery protocol allows the newly added control point to search for devices of interest on the network. Discovery messages are exchanged between such devices and control points including specifics about the device or its services, e.g., type, universally unique identifier, parameters that identify current state of the device, etc.

In a conventional network, when a device is newly added to a network, the device multicasts discovery messages to advertise itself and its embedded devices. To this end, the device may multicast discovery messages to a standard address and port such that any interested control point 303 may detect notifications that new capabilities are available from the standard address or port. Each discovery message may contain information specific to the embedded device.

Typically, when a device is added to the network, the device may multicast discovery messages to advertise its root device 301, any embedded devices, and any services. Discovery messages may contain several components including a notification type (e.g., device type) sent within a notification type header field, for example, and an identifier for the advertisement sent in a unique service name header field. The discovery message may also contain a uniform resource locator (URL) for information relating to the device, or enclosed device in the case of a service, sent in a location header field. Further, discovery messages may include a duration during which the advertisement is valid, sent in a cache control header field, for example.

According to the present disclosure, the information specific headers previously mentioned, e.g., notification type header, unique service name header, URL location header, cache control header, may occur at layer 2 to enable earlier and more efficient compatibility (e.g., services, formats) checking between devices. Further, layer 2 may further include a new header definition for the discovery messages to advertise root device details and service capabilities. Further still, information exchange at layer 2 will identify the layer 3 protocol (e.g., UPnP, Bonjour) to promote more efficient compatibility checking between devices.

Thus, the advertising of root device details (e.g., specifics of the device, current state of the device) and advertising of root device service capabilities may occur simultaneously, such as both during layer 2 of the communications stack.

If the formats specified in the message are not compatible with the first IHS 5, a service capability may be provided in step 306 such that the first IHS 5 may request a file from the second IHS 105 that resolves the incompatibility. In response to requesting the service capability in step 308, a the resolving the incompatibility may be received by the second IHS 105, and the first IHS 5 may respond in step 310 by creating a connection at layer 2 of the communications stack.

In another implementation, the message may specify a universal resource locator (URL) for retrieving a file that resolves a compatibility issue between the first IHS 5 and the second IHS 105. In such an implementation, the first IHS 5 may retrieve the file using the Internet.

Methods and systems of the present disclosure provide r jeans to enable a high probability rate of successful connection at layer 3 by increasing information exchange (i.e., adding a layer of intelligent functions) at layer 2. By establishing a network connection based on the layer 2 protocols, typical layer 3 connection issues may be avoided. For example, a connection at the layer 3 level may not be attempted in the event that compatibility issues are being addressed at the layer 2 level. Also, methods and systems herein provide means to speed the connectivity between an IHS and a device, or between IHSs by providing additional information exchange interface at the layer 2 level.

Another advantage of the present disclosure is that modifications of networking protocols made at layer 2 do not affect the traditional layer 3 protocols. If needed, layer 3 may directly eliminate the result of such modifications, such as services of the device and formats/protocols supported by a device from layer 2, thus not wasting any computational resources. Furthermore, users may also allow layer 3 to perform a typical task such as an assurance for the result of layer 2 at their discretion. Such methods and systems may thus provide computational resource savings and improve user satisfaction.

Methods and systems herein may improve efficiency in device-to-device exchanges such as connecting an IHS or mobile device wirelessly to a kiosk to purchase or download data (e.g., movies), or allowing a camera to print wirelessly. The present disclosure may have applicability in enabling connection, with minimal configuration or manual intervention, to any device regardless of medium utilized, i.e., Wi-Fi, Ethernet, 60 GHz, powerline, phone, Coax, etc. Further, improvements disclosed herein may allow legacy (e.g., non-DLNA/UPnP) enabled devices to connect/share data and enable a preferred device (e.g., IHS, PC, mobile device) to share capabilities and services with connected devices.

Furthermore, methods of the present disclosure, detailed description and claims may be presented in terms of logic, software or software implemented aspects typically encoded on a variety of storage media or medium including, but not limited to, computer-readable storage medium/media, machine-readable storage medium/media, program storage medium/media or computer program product. Such storage media, having computer-executable instructions, may be handled, read, sensed and/or interpreted by an information handling system. Generally, computer-executable instructions, such as program modules, may include routines, programs, objects, components, data structures, and the like, which perform particular tasks, carry out particular methods or implement particular abstract data types. Those skilled in the art will appreciate that such storage media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. A method of coupling multiple information handling systems (IHSs) through a communications stack comprising a physical layer (layer 1), a network layer (layer 2), and a device discovery and control layer (layer 3), the method comprising:
   establishing connection between a first IHS and a second IHS at layer 1 of the communications stack;
   receiving, at the first IHS, a message indicating a type of layer 3 protocol of the second IHS;
   determining whether to establish the connection between the first IHS and the second IHS at layer 2 of the communications stack, based on whether the type of layer 3 protocol of the second IHS matches a type of layer 3 protocol of the first IHS;
   multicasting one or more discovery messages to a standard address and a port by at least one of the first IHS and the second IHS to advertise a root device, an embedded device, or a service, wherein the discovery messages comprise at least one of a notification type, a uniform resource locator, and duration of validity of the discovery messages; and
   detecting at one or more control points at least one of the one or more discovery messages.

2. The method of claim 1, further comprising connecting the first IHS to the second IHS at the layer 2 of the communications stack if the first IHS supports the type of layer 3 protocol of the second IHS.

3. The method of claim 1, further comprising simultaneously advertising root device details and root device service capabilities between the first IHS and the second IHS.

4. The method of claim 1, wherein the type of layer 3 protocol of the second IHS is Universal Plug and Play.

5. The method of claim 1, further comprising displaying an error message if the first IHS does not support the layer 3 protocol of the second IHS, wherein the error message further indicates a service capability of the second IHS, and wherein determining whether to further establish the connection between the first IHS and the second IHS at the layer 2 is based on the service capability.

6. The method of claim 5, further comprising connecting the first IHS to the second IHS at the layer 2 of the communications stack if:
   the first IHS supports the type of layer 3 protocol of the second IHS; and
   the first IHS is compatible with the service capability.

7. The method of claim 5, further comprising displaying the error message if the first IHS is not compatible with the service capability.

8. The method of claim 5, wherein the error message further indicates that a file is transferrable from a device to the first IHS to make the first IHS compatible with the service capability.

9. The method of claim 8, further comprising:
   requesting the file from the device;
   receiving the file from the device to make the first IHS compatible with the service capability; and
   connecting the first IHS to the second IHS at layer 2 of the communications stack.

10. The method of claim 9, wherein the device is one of:
    the second IHS; and
    the device accessible to the first IHS over a network.

11. The method of claim 5, wherein the service capability comprises a service that the second IHS provides using a data file in a given format.

12. The method of claim 11, wherein the first IHS stores the data file in the given format.

13. A first information handling system (IHS) comprising:
   a memory operable to store an operating system (OS), wherein the OS is operable to:
      use a communications stack comprising a physical layer (layer 1), a network layer (layer 2), and a device discovery and control layer (layer 3) connect the first IHS to a second IHS at layer 1 of the communications stack;
      receive, at the first IHS, a message over the layer 1 connection indicating a service capability of the second IHS, and a type of layer 3 protocol of the second IHS;
      determine whether to connect the first IHS to the second IHS at layer 2 of the communications stack, based on the service capability and based on whether the type of layer 3 protocol of the second IHS matches a type of layer 3 protocol of the first IHS;
      multicast one or more discovery messages to a standard address and a port by at least one of the first IHS and the second IHS to advertise a root device, an embedded device, or a service, wherein the discovery messages comprise at least one of a notification type, a uniform resource locator, and duration of validity of the discovery messages; and
      detect at one or more control points at least one of the one or more discovery messages.

14. The system of claim 13, wherein the type of layer 3 protocol of the second IHS is Universal Plug and Play.

15. The system of claim 13, wherein the OS is operable to connect the first IHS to the second IHS at layer 2 of the communications stack if:
   the first IHS supports the type of layer 3 protocol of the second IHS; and
   the first IHS is compatible with the service capability.

16. The system of claim 15, further comprising software operable to play a video file stored in a given format, wherein the service capability comprises a file transfer of the video file from the second IHS to the first IHS, wherein the first IHS is compatible with the service capability if the second IHS stores the video file in the given format.

17. The system of claim 15, wherein the service capability comprises printing an image from a file stored in a given format, and wherein the first IHS is compatible with the service capability if the first IHS stores the file in the given format.

18. A method for connecting a first information handling system (IHS) to a second IHS through a communications stack comprising a physical layer (layer 1), a network layer (layer 2), and a device discovery and control layer (layer 3), the method comprising:
   connecting the first IHS to the second IHS at layer 1 of the communications stack;
   receiving, at the first IHS, a message over the layer 1 connection indicating a type of layer 3 protocol of the second IHS;
   multicasting one or more discovery messages to a standard address and a port by at least one of the first IHS and the second IHS to advertise a root device, an embedded device, or a service, wherein the discovery messages comprise at least one of a notification type, a uniform resource locator, and duration of validity of the discovery messages;
   detecting at one or more control points at least one of the one or more discovery messages;

connecting the first IHS to the second IHS at layer 2 of the communications stack, if:
  the first IHS is compatible with a service capability; and
  the first IHS supports the type of layer 3 protocol of the second IHS; and
if the first IHS is not compatible with the service capability, prompting a user to retrieve a file to make the first IHS compatible with the service capability.

19. The method of claim 18, wherein the type of layer 3 protocol of the second IHS is Universal Plug and Play.

20. The method of claim 18, further comprising simultaneously advertising root device details and root device service capabilities between the first IHS and the second IHS.

* * * * *